April 16, 1935.  D. E. HEINZ  1,998,135
BELT APRON FASTENER
Filed April 4, 1934
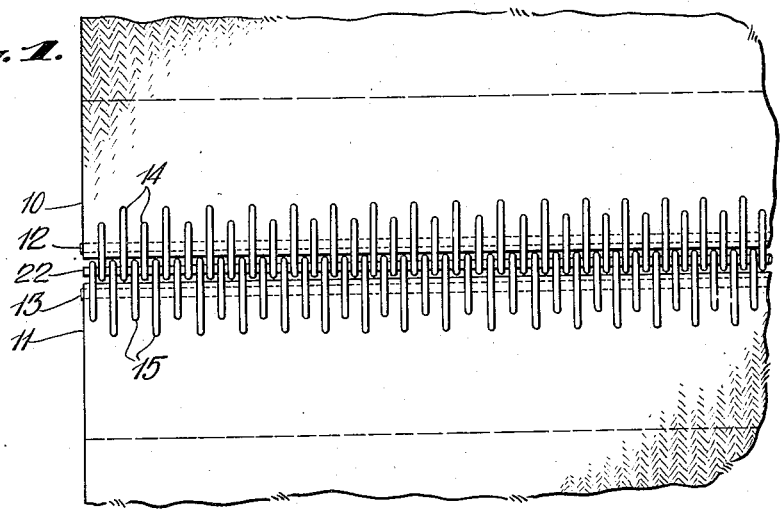
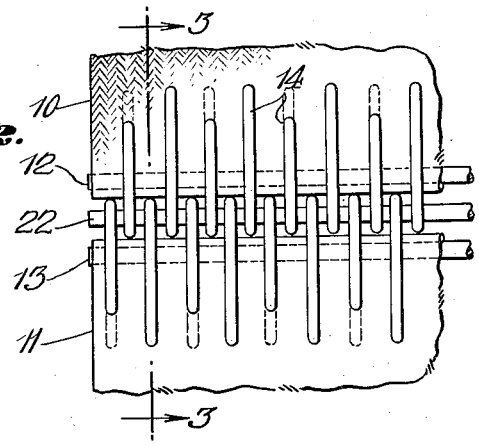
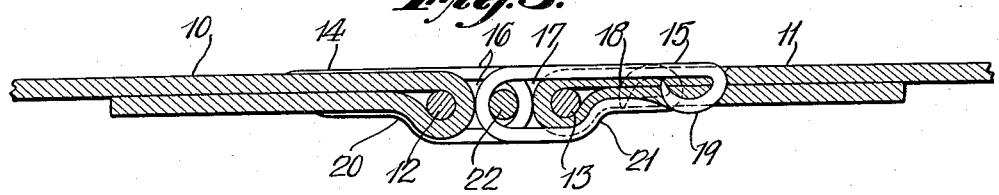
INVENTOR
DAVID E. HEINZ.
BY
ATTORNEYS Patented Apr. 16, 1935

1,998,135

UNITED STATES PATENT OFFICE 1,998,135

BELT APRON FASTENER

David E. Heinz, Chicago, Ill., assignor to H. Kohnstamm & Co., Inc., New York, N. Y.

Application April 4, 1934, Serial No. 718,909

9 Claims. (Cl. 24—33)

My invention relates to a fastening means for fastening the abutting ends of a fabric belt or apron by means of clips, known in the trade as a clipper fastener.

In fasteners of this type, clips are fastened into the ends of the belt or apron in spaced uniform distances transversely of the belt, with their ends projecting in the form of loops. The projecting loops of the clips of one belt or apron end or edge are slightly offset from those of the opposite or abutting edge, so that they may be interleaved. A transverse rod is then inserted in the manner of a pintle, thereby fastening the ends together through the loops.

When this method of construction is applied to textile belts or aprons, such for example as those of canvas or duck, and having a considerable width as for example in the aprons or belts of ironing machines, the fabric material may stretch at some points, particularly at the edges of the belt, putting an excess stress on the clips at these points and tending to tear them loose from the fabric. When the loops at one point are thus loosened the stress is transmitted or added to that of the next adjacent clips which are thereby loosened or torn and thus the loosening of the clips takes place progressively from any point of special stress or weakness. When this fastening construction is applied to textile or similar belts or aprons of considerable width, the deterioration or destruction of the fastening structure is accelerated by the above steps.

An object of my invention is to provide a fastening for aprons or similar structures, in which this tendency for a progressive loosening or tearing free of the clips is counteracted and avoided and in which the stresses on the individual clips are spread or distributed throughout a considerable area of the apron and concentrations of stress thereby avoided.

Various features of the invention are illustrated in the accompanying drawing, in which—

Fig. 1 shows a face view of a portion of a belt or apron embodying a preferred form of the invention; Fig. 2 is a similar view on a larger scale, and Fig. 3 is a section through the belt or apron taken on the line 3—3 of Fig. 2.

In my invention a transverse reinforcement is provided in each abutting end of the apron or belt and the clips are so mounted on the belt or apron that stresses or tension applied to the clips are transmitted directly or immediately to this reinforcement from which they are distributed transversely to the structure of the belt or apron. In the particular embodiment of the invention shown in the accompanying drawing, this reinforcement is in the form of a transverse rod about which the ends of the belt or apron to be joined are folded or wrapped in position to be engaged by the clips.

Referring to the drawing, the abutting ends 10 and 11 of the belt or apron to be fastened are wrapped about transverse rods 12 and 13 respectively. Clips 14 are then mounted at uniformly spaced intervals lengthwise of the rod 12, and transverse of the belt or apron and similar clips 15 are arranged at equally spaced intervals lengthwise of the rod 13. These clips are so positioned as to project from the folded ends of the fabric belts 10 and 11 and form projecting loops 16 and 17. The ends of the clips overlying the fabric belts 10 and 11 are of hooked formation and when driven into the belt engage it from opposite sides as indicated at 18 and 19, thus securing and anchoring the clips to the belt. During this forcing inward of the clips, they are bent tightly against the rods 12 and 13 as indicated at 20 and 21 respectively (Fig. 3) so that any longitudinally applied tension on the clips is transmitted directly to the rods 12 and 13 respectively. The hooked formations 18 and 19 on opposite sides of the belt are spaced unequally from the ends of the loops so as to obtain a wide engagement on the fabric belt. The fastening is completed by assembling the belts with the projecting looped parts of the clips interleaved and then inserting a connecting rod or wire 22 through the overlapping space of the loops. The construction thus forms a hinged fastening with the rod 22 connecting as a pintle or pin.

When any exceptional stress is applied to a particular clip, as for example by a stretching of the material near this clip, or a localized stress is imposed on any clip or clips, or any other cause, this stress is distributed transversely by the rods or reinforcements 12 or 13 and thus distributed over a large number of clips. Concentration of stress is thereby avoided. Or, if any weakness should develop in any clip or clip fastening, the unsupported stresses resulting are transmitted for a considerable distance transversely and not thrown directly onto the next adjacent clip. The progressive tearing loose of the clip is thereby obviated.

Various other modifications may be made by those skilled in the art without departing from the invention as defined in the following claims.

What I claim is:—

1. A fastening of the type described comprising flexible material having end edges in close proximity, transverse reinforcements, one for each end, of greater rigidity than said material and assembled therewith at the respective ends to receive tensile stresses therefrom at said ends of greater rigidity than said material and looped clips projecting from said ends in interleaved relation and engaging said reinforcements to transmit their tensions to said reinforcement and a transverse pintle rod fastened through the projecting loops of said clips.

2. A connecting fastening of the type described comprising a transverse reinforcement, ends of the strip to be fastened lapped about said reinforcement, clips secured to said lapped structure and in stress transmitting relation to said reinforcement and having projecting loops and a rod passed through said projecting loops in the manner of a pintle.

3. A clip fastening construction which comprises a transverse reinforcement, a fabric lapped about said reinforcement and clips secured through the lapped portion of said fabric about the reinforcement of said fabric and extending forwardly therefrom in loops at uniformly spaced distances transversely of said fastening.

4. A fastening of the type described which comprises a transverse reinforcing rod, a flexible material lapped about said rod and clips penetrating said lapped material adjacent said rod and projecting from the ends of said material in uniformly spaced loops.

5. A fastener of the type described which comprises a flexible material having its ends brought into close proximity, reinforcements one for each of said ends and assembled therewith to receive tensile stresses directly therefrom said reinforcements having greater rigidity than said material and clips engaging said reinforcements from opposite sides in stress transmitting relation to said reinforcement, said clips having projecting loops at spaced intervals, loops of one end being interleaved with those of the other, and a pintle rod fastened through said loops to join them in a hinged union.

6. A fastening means which comprises a sheet of flexible material, a relatively rigid transverse reinforcement at the end thereof and looped clips extending from said end at spaced intervals transversely to said sheet and mounted to transmit longitudinal tensions to said reinforcement.

7. Means for fastening two sheet ends in a flexible fastener which comprises relatively rigid transverse reinforcements assembled therewith, one at each of said sheet ends to receive tensile stresses therefrom, looped clips extending from each of said ends toward the other end at spaced intervals and in interleaved arrangement and mounted to transmit longitudinal tensions to their respective reinforcements and a pintle pin extending through the interleaved loops to secure them in a hinged joint.

8. A fastening means comprising a substantially rigid transverse reinforcement, a sheet of flexible material having one end assembled with said reinforcement to receive tensile stresses therefrom and a series of looped clips secured to said sheet and reinforcement assembly at spaced intervals transversely of said sheet.

9. A fastening for securing two sheet ends in a flexible fastening which comprises substantially rigid transverse reinforcements, one assembled with each sheet end to receive tensile stresses therefrom, a series of looped clips, one of each series secured to said sheet and reinforcement assembly at spaced intervals transversely of said sheet with the projecting looped ends interleaved with those of the opposite sheet end and a pintle extending through said interleaved loops to form a hinge connection.

DAVID E. HEINZ.